(12) United States Patent
Dreyer et al.

(10) Patent No.: US 7,338,607 B2
(45) Date of Patent: Mar. 4, 2008

(54) FILTER CANISTER, SYSTEM CONTAINING FILTER CANISTER, AND THEIR USE

(75) Inventors: Harold B. Dreyer, Anchorage, AK (US); Dennis Nottingham, Anchorage, AK (US)

(73) Assignee: Gunderboom, Inc., Anchorage, AK (US)

( * ) Notice: Subject to any disclaimer, the term of this patent is extended or adjusted under 35 U.S.C. 154(b) by 0 days.

(21) Appl. No.: 10/287,859

(22) Filed: Nov. 4, 2002

(65) Prior Publication Data
US 2003/0089658 A1 May 15, 2003

Related U.S. Application Data

(60) Provisional application No. 60/335,179, filed on Nov. 2, 2001.

(51) Int. Cl.
*B01D 37/00* (2006.01)
*B01D 39/08* (2006.01)

(52) U.S. Cl. .................. 210/767; 210/221.2; 210/437; 210/438; 210/485

(58) Field of Classification Search ............... 210/437, 210/438, 440, 441, 483, 485, 507, 767, 747, 210/170, 220, 221.1, 221.2, 488, 489, 170.01, 210/170.02, 170.11, 170.09, 170.1
See application file for complete search history.

(56) References Cited

U.S. PATENT DOCUMENTS

| | | | |
|---|---|---|---|
| 330,145 A | 11/1885 | Oldham | |
| 2,249,063 A | 7/1941 | Swem | |
| 2,568,085 A | 9/1951 | Naugle | |
| 2,985,307 A * | 5/1961 | Grasmere et al. | 210/169 |
| 3,023,905 A * | 3/1962 | McDougal et al. | 210/172 |
| 3,347,383 A | 10/1967 | Augerot | |
| 3,659,713 A | 5/1972 | Mueller | |
| 3,713,540 A | 1/1973 | Davidson et al. | |
| 3,826,372 A * | 7/1974 | Bell | 210/172 |
| 3,899,424 A | 8/1975 | Lake | |
| 3,979,289 A | 9/1976 | Bykowski et al. | |
| 4,178,245 A | 12/1979 | Nakaoka et al. | |
| 4,218,322 A * | 8/1980 | Kojima | 210/391 |

(Continued)

FOREIGN PATENT DOCUMENTS

FR 2195-238 8/1972

(Continued)

*Primary Examiner*—Fred G. Prince
(74) *Attorney, Agent, or Firm*—Nixon Peabody LLP

(57) ABSTRACT

A filter canister including a frame; a sheet of flexible fabric material that allows the flow of water therethrough, the sheet of flexible fabric material being connected to the frame in a manner defining an internal zone whereby substantially all fluid entering the internal zone from an opposite side of the sheet of flexible fabric material passes therethrough; and a conduit having a first end located externally of the frame and a second end located within the internal zone defined by the sheet of flexible fabric material; wherein, upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system. A system and method for filtering fluid intake water are disclosed.

36 Claims, 6 Drawing Sheets

U.S. PATENT DOCUMENTS

| | | | |
|---|---|---|---|
| 4,219,423 A | 8/1980 | Smith, Jr. | |
| 4,285,821 A * | 8/1981 | Hiesinger et al. | 210/777 |
| 4,288,321 A | 9/1981 | Beane | |
| 4,296,884 A | 10/1981 | Luebke | |
| 4,419,232 A | 12/1983 | Arntyr et al. | |
| 4,516,994 A * | 5/1985 | Kocher | 55/337 |
| 4,582,048 A | 4/1986 | Sorensen | |
| 4,669,972 A | 6/1987 | Koblanski | |
| 4,692,059 A | 9/1987 | Juutilainen | |
| 4,749,479 A | 6/1988 | Gray | |
| 4,880,333 A | 11/1989 | Glasser et al. | |
| 4,919,820 A | 4/1990 | Lafay et al. | |
| 4,988,235 A * | 1/1991 | Hurley | 405/50 |
| 5,102,261 A | 4/1992 | Gunderson, III | |
| 5,139,686 A | 8/1992 | Cares | |
| 5,197,821 A | 3/1993 | Cain et al. | |
| 5,220,958 A | 6/1993 | Bernhardt | |
| 5,225,622 A | 7/1993 | Gettle et al. | |
| 5,227,060 A * | 7/1993 | Roy et al. | 210/258 |
| 5,322,629 A | 6/1994 | Stewart | |
| 5,345,741 A | 9/1994 | Slater et al. | |
| 5,354,456 A | 10/1994 | Montgomery et al. | |
| 5,354,459 A | 10/1994 | Smith | |
| 5,372,711 A | 12/1994 | Sill | |
| 5,394,786 A | 3/1995 | Gettle et al. | |
| 5,427,679 A | 6/1995 | Daniels | |
| 5,558,462 A | 9/1996 | O'Haver | |
| RE36,297 E | 9/1999 | Heino et al. | |
| 5,980,740 A * | 11/1999 | Harms et al. | 210/162 |
| 5,992,104 A | 11/1999 | Hudak | |
| 6,337,025 B1 | 1/2002 | Clemenson | |
| 6,485,229 B1 * | 11/2002 | Gunderson et al. | 405/63 |
| 6,488,846 B1 * | 12/2002 | Marangi | 210/232 |
| 6,598,580 B2 * | 7/2003 | Baumann et al. | 123/198 E |
| 6,660,170 B2 * | 12/2003 | Dreyer et al. | 210/747 |
| 6,843,924 B2 * | 1/2005 | Dreyer et al. | 210/747 |
| 2002/0080681 A1 | 6/2002 | Dreyer et al. | |
| 2003/0010704 A1 | 1/2003 | Claypoole et al. | |

FOREIGN PATENT DOCUMENTS

| | | |
|---|---|---|
| FR | 2284-709 | 9/1974 |
| FR | 2329-808 | 11/1975 |
| FR | 2579-239 A | 3/1985 |
| GB | 2 246 981 A | 2/1992 |
| WO | WO 91/07546 | 5/1991 |
| WO | WO 99/19570 | 4/1999 |

* cited by examiner ies, the size of the system can be a problem when the boom system encroaches upon navigable waters. Thus, it would be desirable to produce an alternative filtration system which avoids this problem.

FILTER CANISTER, SYSTEM CONTAINING FILTER CANISTER, AND THEIR USE

This application claims the benefit of U.S. Provisional Patent Application Ser. No. 60/335,179 filed Nov. 2, 2001, which is hereby incorporated by reference in its entirety.

FIELD OF THE INVENTION

The present invention relates to a method and apparatus for excluding suspended particulates and/or aquatic life from entrainment within, e.g., a cooling system water intake site of a facility using industrial water.

BACKGROUND OF THE INVENTION

Industrial plants and power plants utilize water from nearby water sources for cooling purposes. Aquatic life (e.g., fish, fish eggs, larvae, zebra mussels, vegetation, etc.) in the surrounding water body is often negatively impacted by entrainment within the cooling system water intakes. Cooling systems are also negatively impacted by the entrainment of sediments and debris from the surrounding water body. Entrained contaminants within the cooling systems can result in system failures due to damaged components and costly shut-downs for frequent maintenance and/or repairs.

Floating barrier or containment/exclusion boom systems have been installed at these water intakes to deal with these problems. These boom systems are optimal for some situations, but the size of the system can be a problem when the boom system encroaches upon navigable waters. Thus, it would be desirable to produce an alternative filtration system which avoids this problem.

The large amount of water which has traditionally been diverted by industrial water users has had a significant, negative impact on the aquatic life in the surrounding body of water. The increase in temperature of the water diverted to the cooling system can, upon return to the body of water, raise the temperature of the water, possibly having negative effects upon aquatic life. Recent changes in federal regulations governing industrial water usage mandate a substantial reduction in the amount of water which can be diverted. This lower demand results in a lower flow rate. This decrease in flow rate leads to a decrease in the required amount of filtering area in containment/exclusion barrier systems. It would be advantageous, then, to have a containment/exclusion barrier system which would function optimally with the federally mandated changes in water usage for industrial plants and power plants, while avoiding the other problems attendant with the such usage.

The present invention is directed toward overcoming these deficiencies.

SUMMARY OF THE INVENTION

A first aspect of the present invention relates to a filter canister for use in a fluid intake system. The filter canister includes: a frame; a sheet of flexible fabric material that allows the flow of water therethrough, the sheet of flexible fabric material being connected to the frame in a manner defining an internal zone whereby substantially all fluid entering the internal zone from an opposite side of the sheet of flexible fabric material passes therethrough; and a conduit having a first end located externally of the frame and a second end located within the internal zone defined by the sheet of flexible fabric material; wherein, upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system.

A second aspect of the present invention relates to a filter canister for use in a fluid intake system. The filter canister includes: a frame including two or more sections, with one of the sections being substantially fluid impervious; a multi-layered sheet of flexible fabric material that allows the flow of water therethrough, the sheet of flexible fabric material being connected to another of the two or more sections in a manner defining an internal zone whereby substantially all fluid entering the internal zone from an opposite side of the sheet of flexible fabric material passes therethrough; a conduit extending, with a substantially fluid tight seal, through the one section of the frame, with a first end located externally of the frame and a second end located within the internal zone; and a gas injection system including a source of compressed gas in fluid communication with at least one outlet positioned between two layers of the sheet of flexible fabric material; wherein, upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system.

A third aspect of the present invention relates to a filter canister for use in a fluid intake system. The filter canister includes: a frame including horizontal and vertical support members and an upper end; a sleeve formed of multi-layers of flexible fabric material that allow the flow of water therethrough, the sleeve having a closed end and an open end and being connected internally of the frame with the open end adjacent the upper end of the frame, the sleeve defining an internal zone whereby substantially all fluid entering the internal zone from an opposite side of the sleeve passes through the multi-layers of flexible fabric material; a conduit passing through the open end of the sleeve with a first end located externally of the frame and a second end located within the internal zone; and a gas injection system including a source of compressed gas in fluid communication with at least one outlet positioned between two layers of the flexible fabric material that form the sleeve; wherein, upon connection of the first end of the conduit to a fluid intake system, fluid is drawn through the multi-layers of flexible fabric material into the internal zone, thereby filtering the fluid, and filtered fluid is drawn through the second end of the conduit for delivery into the fluid intake system.

A fourth aspect of the present invention relates to a system for filtering fluid intake water. The system includes: a fluid intake system including at least one inlet in fluid communication with a fluid intake pump and at least one filter canister of the present invention with the first end of the conduit in fluid communication with the at least one inlet.

A fifth aspect of the present invention relates to a method of filtering water entering a water intake system. The method includes: installing a filter canister of the present invention into a water intake system (i.e., in a body of water) such that the second end of the conduit is below the water surface, and drawing water through the water intake system, whereby water entering the fluid intake system is drawn through the flexible fabric material into the internal zone, thereby filtering the fluid, prior to passing through the second end of the conduit for delivery into the fluid intake system.

The filter canisters and systems of the present invention offer a number of advantages over full length containment/exclusion boom systems. In particular, due to their compact size, the filter canisters of the present invention are particularly useful for water intake systems that draw from bodies of water close to navigable sections of the water. Due to their compact size and ease of connection to water intake systems, the filter canisters can be connected to inlets of the water intake system such that an arrangement of multiple filter canisters will not encroach upon navigable waters, i.e., they can be kept close to the shoreline in shallow waters. This is of significant importance in various industries that employ water-cooling systems, who will be able to utilize the filter canisters of the present invention to comply with governmental regulations (regarding exclusion of aquatic biota) rather than installing expensive dry cooling towers. The filter canisters constructed with geosynthetic fabric materials and gas injection cleaning systems allow permanent or semipermanent installation of the filter canisters, which can minimize the necessity of shutting down water intake systems for routine cleaning and maintenance.

DETAILED DESCRIPTION OF THE INVENTION

Figure 1:
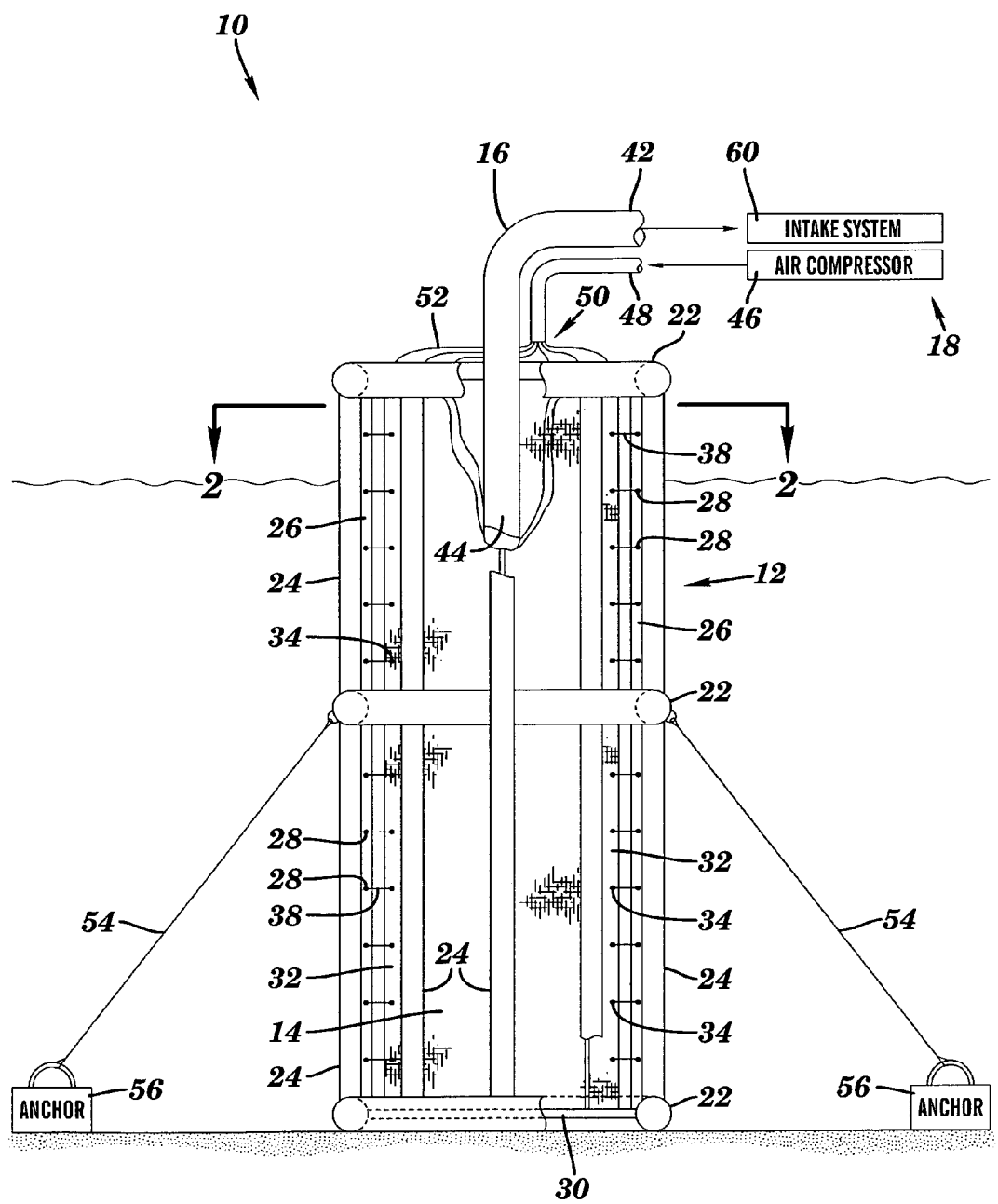
FIG. 1 is an elevational view of a filter canister in accordance with one embodiment of the present invention. Portions of the filter canister frame are broken away to show the sleeve of flexible fabric material connected internally of the frame and portions of the sleeve are broken away to show the end of the conduit that lies within the internal zone defined, in this embodiment, by the sleeve of flexible fabric material. The filter canister is shown coupled to a water intake system.

As shown in the accompanying drawings, the present invention relates to a system designed for filtration of water taken up by a water intake system and the filter canisters which are the actual site of filtration in such a system.

The filter canisters of the present invention are characterized by a frame and a configuration of flexible fabric material that allows the flow of water therethrough, which configuration of flexible fabric material is connected to the frame in a manner such that the flexible fabric material alone or in combination with the frame defines an internal zone of the filter canister, whereby substantially all water entering the internal zone from an opposite side of the flexible fabric material (i.e., outside the internal zone) passes therethrough. A conduit is provided having a first end located externally of the frame and a second end located within the internal zone wherein, upon connection of the first end of the conduit to a water intake system, water is drawn through the flexible fabric material into the internal zone, thereby filtering the water, and filtered water is drawn through the second end of the conduit for delivery into the water intake system.

The frame can be constructed of any of a variety of suitable materials so long as they tend to resist wear associated with marine environments. Such materials include thermoplastic materials and metals that resist rusting, such as aluminum and stainless steel. Connections between the frame members can be made in any suitable manner and in consideration of the materials that form the frame members. These include welding, soldering, sonic welding, marine adhesives, mechanical connections, etc. Where frame connections are intended to seal two frame members together, and a sealed connection is desired (such that water will not flow through the connection to any significant extent), a sealant may be applied to the connection either before or after the connection is made. For mechanical connections, gaskets or other sealing agents can be used as well.

The flexible fabric material is preferably formed of a geosynthetic fabric, such as a geotextile material. Geosynthetic fabric is "hydrophobic" and "water-pervious," meaning that water passes through the fabric. The hydrophobic property of geosynthetic fabric permits the passage of water current therethrough without the fibers absorbing water and swelling, which would reduce the permitivity.

Geosynthetic fabrics are commercially available in a range of tensile strengths, permeabilities, and permitivities, and are useful for the purposes of the invention throughout those ranges.

Depending upon the environmental, tidal, wave and current conditions, anticipated load requirements, and other parameters, the appropriate geosynthetic fabric can be selected to meet the specific design requirements for a given containment/exclusion project design.

Geosynthetic fabric may be prepared using one or a combination of various polymers, for example polyester, polypropylene, polyamides, and polyethylene. Most commercially available geosynthetic fabrics are polypropylene or polyester. Examples of suitable nonwoven geosynthetic fabrics include, but are not limited to, AMOPAVE® 4399, AMOPAVE® HD 4597, 4545, 4553, and 4561 (all polypropylene fabrics commercially available from Amoco Fabrics and Fibers Company); Typar®, a polypropylene fabric commercially available from Dupont; TREVIRA® Spunbond, a polyester fabric commercially available from Hoechst Fibers Industries. Examples of suitable woven geosynthetic fabrics include, but are not limited to, 1380 SILT STOP®, 1198, 1199, 2090, 2000, 2006 (all polypropylene fabrics commercially available from Amoco Fabrics and Fibers Company). The geosynthetic fabrics are nonbiodegradable, so they do not deteriorate due to environmental exposure. During prolonged use, exposure to ultraviolet (UV) light may cause some geosynthetic fabrics to weaken or deteriorate. However, UV-resistant fabrics are commercially available as well as UV resistance treatment methods.

It is preferred that the flexible fabric material is multi-layered, with the multiple layers being formed of the same geosynthetic material or different geosynthetic materials. The multi-layered flexible fabric material can also be segmented into individual panels (i.e., at least two such panels) by stitching, heat sealing, or otherwise physically connecting the two sheets together. The flexible fabric material can be in the configuration of a bag (i.e., open at one end), a sleeve (i.e., open at two ends), or any other desired configuration.

When a two-layered (or multi-layered) flexible fabric material is employed, the layers can be the same or different. Thus, a woven geosynthetic material can be used in combination with a non-woven geosynthetic material, two different woven geosynthetic materials can be used, or two different non-woven geosynthetic materials can be used. The physical structure of the materials can also be modified to affect flow rates therethrough, as taught in U.S. patent application Ser. No. 09/168,491 to Gunderson et al., filed Oct. 8, 1998, now U.S. Pat. No. 6,485,229, which is hereby incorporated by reference in its entirety.

When a two-layered (or multi-layered) flexible fabric material is employed, the filter canister can also be equipped with a gas injection system which includes a source of compressed gas in fluid communication with at least one outlet positioned between the two layers of flexible fabric material. A gas injection system of this type is disclosed in U.S. patent application Ser. No. 09/168,491 to Gunderson et al., filed Oct. 8, 1998, now U.S. Pat. No. 6,485,229, which is hereby incorporated by reference in its entirety. When the two-layered (or multi-layered) sheet of flexible material is segmented into individual panels, each panel may be equipped with its own outlet of the gas injection system. The gas injection system can be used to clean the filter panels of sediments and remove impinging aquatic organisms to maintain adequate water flow. The bubbling action of the expanding air rising up through the filter panel layers shakes and cleans the filter fabric of any sediment and/or aquatic life which may be impinged thereon. (During cleaning, water filtration typically will not be occurring so that the injected air will be allowed to pass externally of the fabric material rather than exclusively into the internal zone.)

The flexible fabric material is preferably connected to the frame by bolting, clamps, fasteners, lacing or any other appropriate attachment method which allows its removal and replacement, if necessary. A plurality of such connections can be made.

The conduit can actually be a single piece or one or more conduits coupled together so as to form a single path for fluid flow. For example, portions of the conduit within the internal zone can be perforated to as to more uniformly draw water over the entire surface area of the flexible fabric material, whereas portions of the conduit external thereof should not be perforated. Alternatively, the conduit can be non-perforated both within the internal zone and outside thereof. Regardless of the type of conduit used, it is preferred that any connection of the conduit passing through the frame and/or flexible fabric material is sealed to prevent water flow into the internal zone without passage through the fabric material. Suitable gaskets and sealants include, without limitation, rubber, silicone, or cork gaskets or silicone or other sealants.

Figure 2:
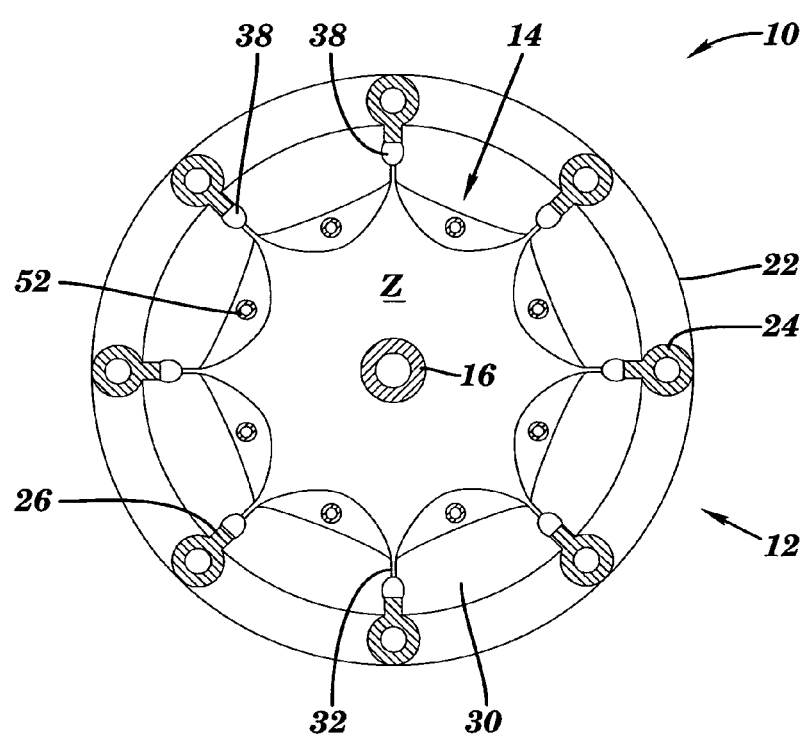
FIG. 2 is a cross section view of the filter canister shown in FIG. 1 along line 2-2 looking in the direction of the arrows.

Referring now to FIGS. 1 and 2, a filter canister 10 in accordance with one embodiment of the present invention is shown. The filter canister 10 includes a frame 12, a sleeve of flexible fabric material 14, a conduit 16, and a gas injection system 18.

The frame 12 is formed of ring-shaped horizontal members 22 and vertical members 24 which are connected together as described above. The vertical members 24 include a flange 26 provided with a plurality of apertures 28 spaced along its length. The lowermost ring-shaped horizontal member includes a plate 30 that is secured thereto, preferably with a sealed connection. (If the sleeve of flexible fabric material 14 is open at both ends thereof, then the lower end is connected to plate 30 with a sealed connection and plate 30 is sealed to the lowermost ring-shaped horizontal member.)

The sleeve of flexible fabric material 14 is formed of two layers of geosynthetic material, which are sewn or otherwise connected together to form panels (eight shown). Where the connections occur, a lengthwise fold of the fabric 32 is formed, along which a plurality of grommets 34 are provided. The grommets 34 are substantially aligned with the apertures 28. The sleeve is preferably closed at its lower end and open at its upper end; however, if the sleeve is open at its lower end, the sleeve can be connected to plate 30 as shown. Thus, in this embodiment the sleeve 14 alone or together with plate 30 defines the internal zone Z (see FIG. 2).

Connectors 38 span between the apertures 28 and the grommets 34 to connect the sleeve of flexible fabric material 14 to the frame 12. Suitable connectors include plastic or wire ties, Q-link quick connectors, other suitable connection means. It is preferable that the connectors are of the type that can be released, such that the sleeve 14 is removably connected to the frame 12.

Conduit 16 as shown is a single continuous elbow conduit having a first end 42 and a second end 44. The first end is located externally of the frame 12 and internal zone Z, while the second end 44 is located within the internal zone Z. Although conduit 16 as shown is not perforated, the portion of conduit 16 which is below the water surface and in the internal zone Z can be perforated. The conduit can be supported physically by the intake system such that the second end is free within the filter canister. Alternatively, the conduit can be physically connected to the frame.

The gas injection system 18 includes a source of compressed gas such as compressor 46, and conduit 48 connected to the source of compressed gas. Conduit 48 has a junction at 50, where smaller diameter tubing 52 branches therefrom. Tubing 52 passes between the two layers of geosynthetic material that form each of the panels of sleeve 14. A perforated diffuser pipe may optionally be provided effectively to produce multiple outlets within each panel section.

To minimize shifting of the filter canister due to current constraints or tidal fluctuations, the filter canister is provided with one or more chains or cables 54 (e.g., steel cables or chain) connected at one end to the frame 12, specifically at eyelets attached to the middle horizontal member 22, and at its opposite end to anchors 56. As an alternative to anchors, pilings and other fixed structures can also be used to secure the opposite end of the tie-line.

In use, the filter canister will be anchored in its desired location in a body of water, such that the water level is below the top of the frame 12. Conduit 16 is then connected at its first end 42 to the existing water intake system 60, either directly or via a newly introduced collector pipe. Valves can also be provided, allowing flow from a specific filter canister to be shut down individually. Once installed, operation of the water intake system will draw water from outside filter canister 10, through the sleeve 14, and into the internal zone Z, thereby filtering the water. Filtered water is then drawn through the second end 44 of the conduit 16 and, ultimately, into the water intake system 60. This type of canister is used preferably in low current conditions such as in lakes and ponds.

Although only a single filter canister 10 is shown in FIGS. 1 and 2, it should be appreciated that a system of such filter canisters can be employed in combination with the water intake system.

Figure 3:
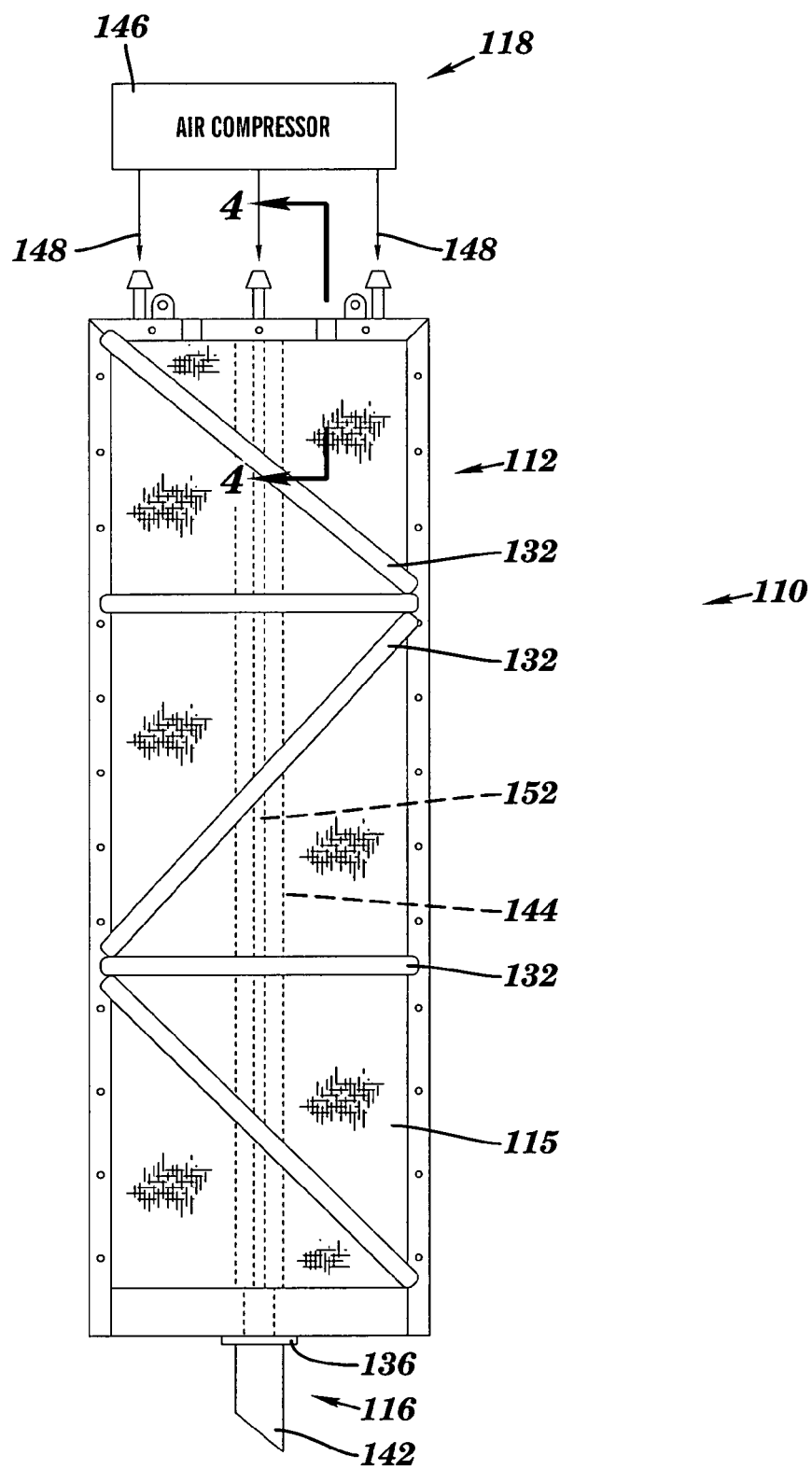
FIG. 3 is an elevational view of a filter canister in accordance with another embodiment of the present invention. Together the frame and panel sections define the internal zone and the end of the conduit, shown in broken lines, lies therein.
Figure 4:
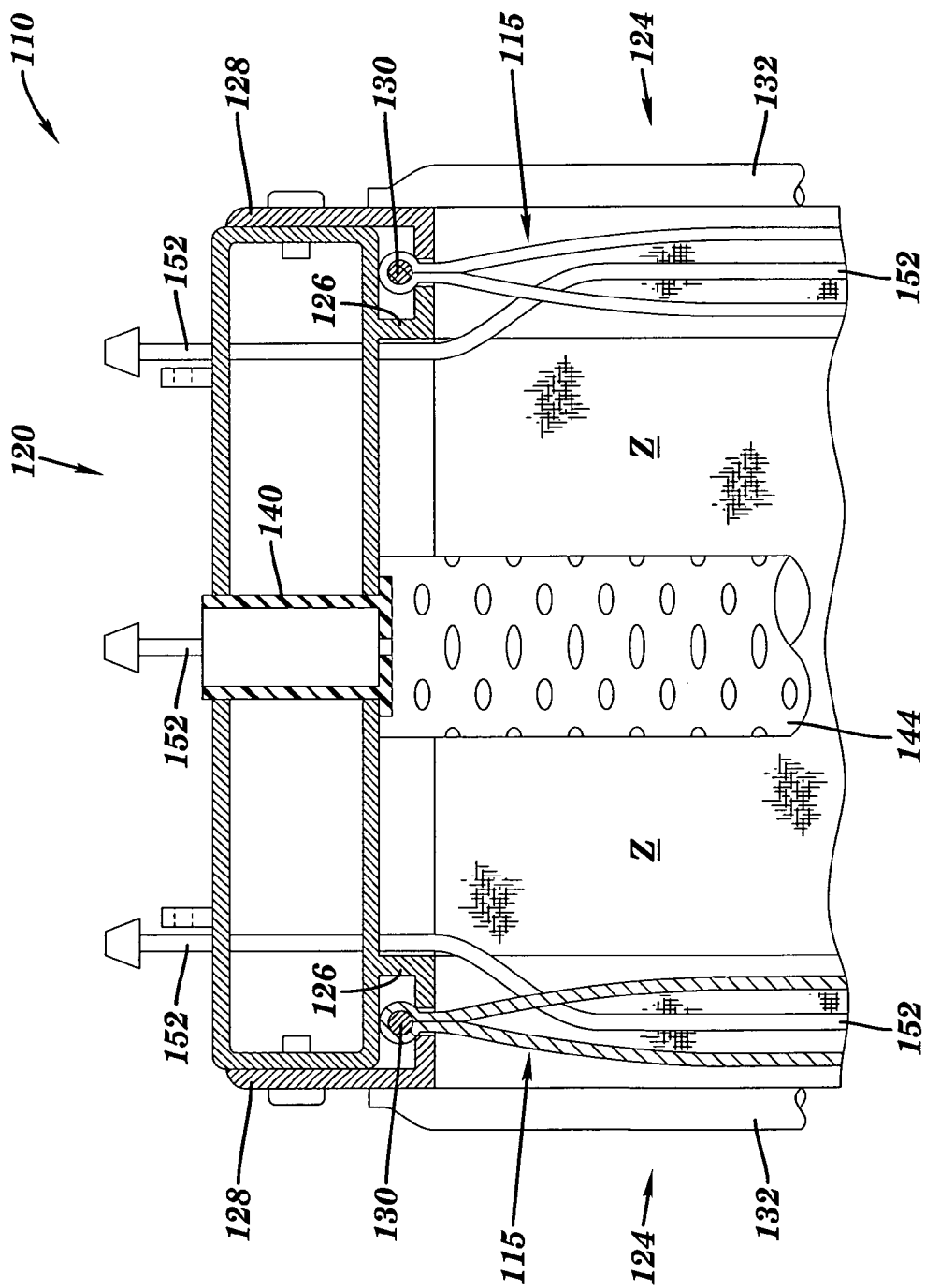
FIG. 4 is a partial cross sectional view of the filter canister shown in FIG. 3 along line 3-3 looking in the direction of the arrows.

Referring now to FIGS. 3 and 4, a filter canister 110 in accordance with a second embodiment of the present invention is shown. The filter canister 110 includes a frame 112, a double-layered sheet of flexible fabric material 115, a conduit 116, and a gas injection system 118.

The filter canister 110 is segmented into two or more sides or sections. As shown, the filter canister has a box-shaped construction with six sides or sections. The upper and lower sections 120, 122 (respectively) are substantially fluid impervious while the four side sections 124 include the double-layered sheet of flexible fabric material 115 supported by the frame.

Referring now to FIG. 4 specifically, a cross-sectional view of the upper section 120 and partial cross-sectional view of two side sections 124 is shown. The intersection between the lower section 122 and the side sections 124 is substantially the same as the intersection between the upper section and the side sections as described immediately below.

The upper section 120 has a tube-like configuration with an integral frame member 126 extending from its lower side adjacent the perimeter thereof. The frame member 126 has a substantially L-shaped cross sectional configuration that opens outwardly. Attached to the sides of the upper section 120 are clamp members 128, which have a reverse L-shaped cross-sectional configuration. The clamp members 128 are attached with machine screws or other suitable connectors. Together, the frame members 126 and clamp members 128 define a recess that receives the edge of the double-layered sheet of flexible fabric material 115. To prevent its edge from escaping the recess during use (i.e., through the opening to the recess), a nylon rod 130 is positioned between the two layers of flexible material and the rod has a thickness that is greater than the dimension of the opening.

Similar connections between the frame 112 and the double-layered sheet of flexible fabric material 115 are provided around the entire perimeter of the four side sections 124. To further support each of the four side sections and provide greater stability to the filter canister, a plurality of braces 132 are welded across each face of the four side sections 124. Thus, in this embodiment the double-layered sheets of flexible fabric material 115 together with frame 112 defines the internal zone Z (see FIG. 4).

Conduit 116 includes a first portion (which includes the first end 142) and a second portion (which includes the second end 144). The second portion is perforated and extends substantially the entire length of the filter canister. The first and second portions are joined together at their intersection with the lower section 122. A gasket 136 seals the junction of the first portion to the lower section 122.

The gas injection system 118 includes a source of compressed gas such as compressor 146, and conduits 148 connected to the source of compressed gas. Conduits 148 connect to smaller diameter tubing 152 that pass through sealed openings in the upper section 120 and between the two layers of geosynthetic material that form each sheet 115. A perforated diffuser pipe may optionally be provided effectively to produce multiple outlets within each panel section.

The upper section 120 also includes an air vent 140 that allows air bubbles trapped in the internal zone Z to escape therefrom. The air vent is a normally closed flapper valve responsive to the air pressure within the internal zone; thus, water will not normally flow through the air vent 140. The air vent is typically only opened during operation of the gas injection system, which is used when filtration is not occurring.

Figure 5:
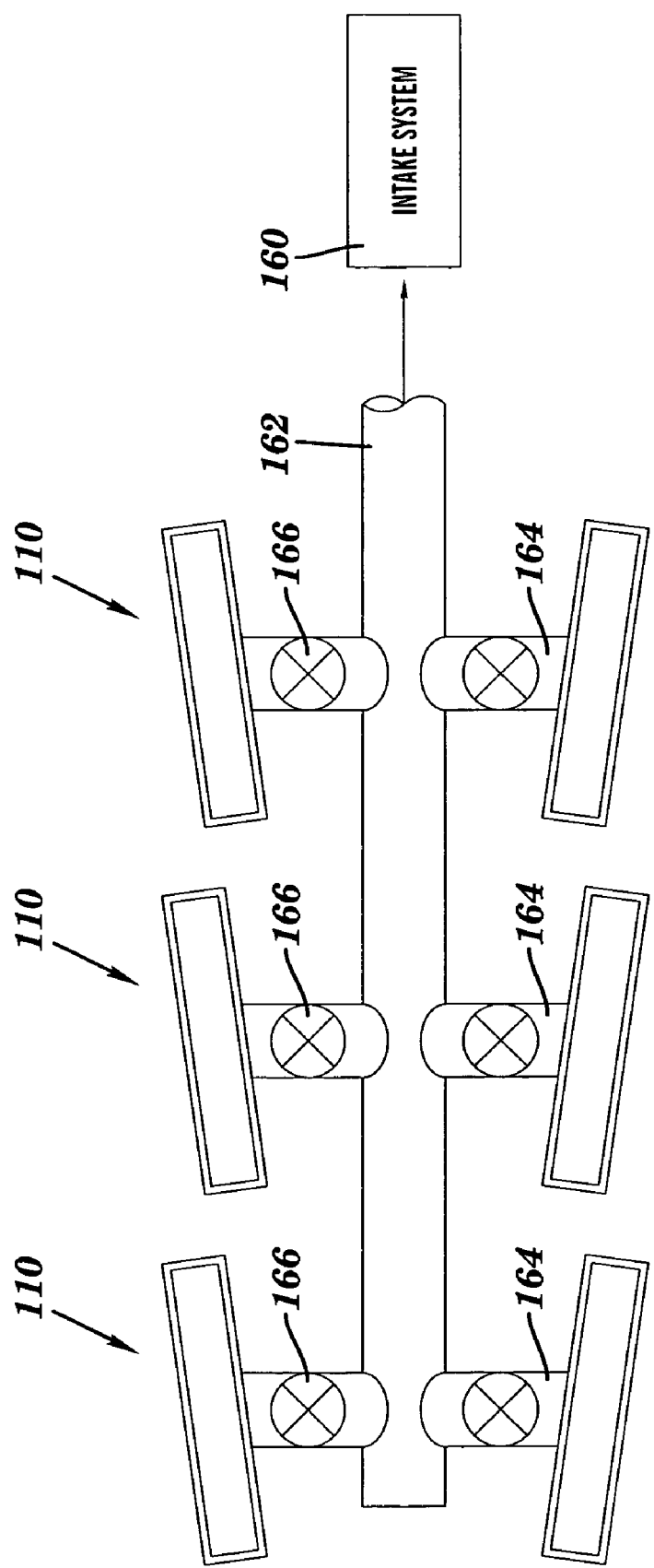
FIG. 5 is a plan view of a water intake system having a collector pipe and a plurality of filter canisters of the second embodiment connected individually via separate conduits to the collector pipe.
Figure 6:
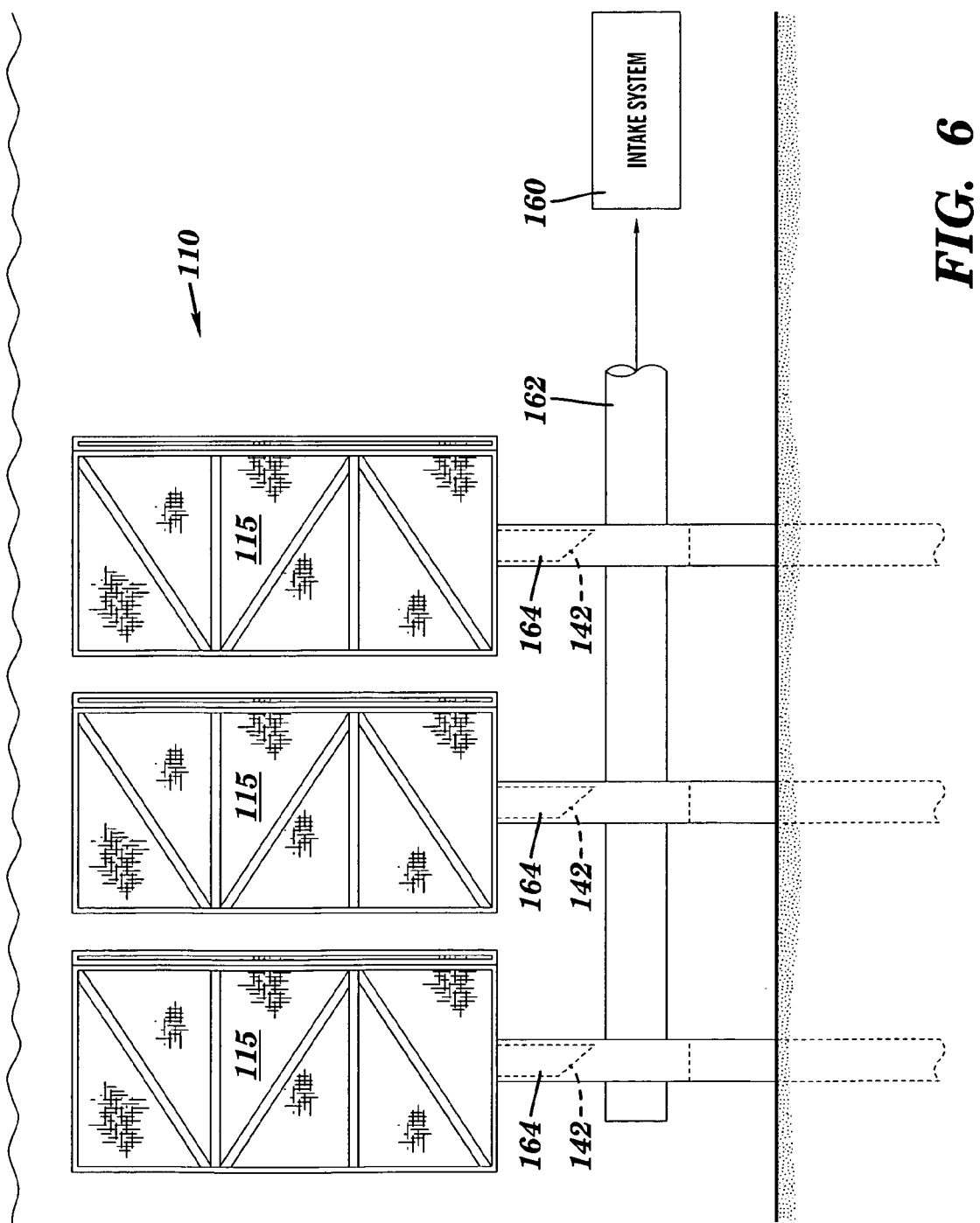
FIG. 6 is an elevational view of the water intake system illustrated in FIG. 5. The filter canisters slip-fit into the ends of their respective conduits.

Referring now to FIGS. 5 and 6, a system of filter canisters 110 according to the second embodiment are utilized with minor modifications to the water intake system 160.

A main collector pipe 162 is attached to the existing water intake structure 160 by welding or any other appropriate method of attachment. The main collector pipe, after attachment to the existing water intake, may be placed anywhere throughout the full water column. Existing structures of the cooling system water intake typically will dictate its placement. The length of the main collector pipe is dictated by individual project design, i.e., shoreline contours, bottom contours, etc. In addition, primary water intake pipes 164 are located along the main collector pipe 162 at intervals indicated by the specific project design. The primary intake pipes 164 define the inlet into the system. The diameter of pipe used for both the main collector pipe and the primary intake pipes is dictated by specific project design (i.e., volume of water required) and are welded in place. All pipe used is steel or any other appropriate material. The primary intake pipes 164 may extend from the main collector pipe horizontally, vertically, or any angle in between. The primary intake pipe is also preferably equipped with a manual and/or automatically regulated valve 166 which enables each primary intake pipe to be closed or opened as desired (i.e., for service) without shutting down the entire water intake system of the plant. Each primary intake pipe is adapted for being coupled to a filter canister of the present invention.

The end of the primary intake pipes 164 furthest from the main collector pipe 162 is sized and configured to receive the second end 142 of conduit 116. The connection is preferably a slip-fit with little tolerance. The gasket 136 also acts to seal the slip-fit connection once the conduit 116 is fully inserted into the end of the primary intake pipe 164.

In use, the filter canister 110 is installed by inserting conduit 116 into the primary intake pipe 164, at which time the filter canister is capable of being used. Valves 166 allow flow from a specific filter canister to be shut down individually. Once installed, operation of the water intake system will draw water from outside filter canister 110, through the double-layered sheets of flexible fabric material 115, and into the internal zone Z, thereby filtering the water. Filtered water is then drawn through the second end 144 of the conduit 116 and, ultimately, into the water intake system 160. This type of canister is used preferably in either low current conditions, such as in lakes and ponds, or high current conditions, such as in rivers and tidal environments.

For each of the embodiments disclosed, the gas injection system can be operated from time to time to clean impinging materials from the exterior thereof (i.e., from sleeve 14 or the double-layered sheets of flexible fabric material 115). To do so, it is desirable to cease drawing water through conduit 16, 116 with the water intake system 60, 160. This will allow the air bubbles to expand the sleeve 14 or the double-layered sheets of flexible fabric material 115 and cause fizzing of the air bubbles to remove the impinging materials.

To replace a filter canister entirely or simply the sheet of flexible material, i.e., after their useful life, the valve on the primary intake pipe can be closed, allowing for removal of the filter canister and its immediate replacement with an alternate filter canister or, following repair of the one removed, its re-installation.

Another aspect of the present invention relates generally to a method of filtering water entering a water intake system by installing a filter canister of the present invention into a water intake system, with the first end of the conduit 16, 116 in fluid communication with an inlet to the water intake systems 60, 160. Water is then drawn through the filter canisters as described above.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A filter canister for use in a fluid intake system, the filter canister comprising:
    a frame;
    a sheet of flexible fabric material that allows a flow of fluid therethrough, the sheet of flexible fabric material being connected to the frame in a manner defining an internal zone whereby substantially all fluid entering the internal zone from an opposite side of the sheet of flexible fabric material passes therethrough, wherein the sheet of flexible fabric is disposed at least partially internally of the frame; and
    a conduit having a first end located externally of the frame and a second end located within the internal zone defined by the sheet of flexible fabric material;
    wherein, upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system.

2. The filter canister according to claim 1, wherein the fluid is water.

3. The filter canister according to claim 1 wherein the sheet of flexible fabric material is a multi-layered sheet of flexible fabric material.

4. The filter canister according to claim 3 wherein the multi-layered sheet of flexible material comprises two layers of flexible fabric material.

5. The filter canister according to claim 4 further comprising:
    a gas injection system comprising a source of compressed gas in fluid communication with at least one outlet positioned between the two layers of flexible fabric material.

6. The filter canister according to claim 5 wherein the multi-layered sheet of flexible fabric material is segmented into at least two panels.

7. The filter canister according to claim 6 wherein the gas injection comprises at least two outlets each in fluid communication with the compressed gas source, with one or more of the at least two outlets being positioned between the two layers of flexible fabric material for each of the at least two panels.

8. The filter canister according to claim 1 wherein the conduit is connected to the frame.

9. The filter canister according to claim 8 wherein a portion of the conduit within the internal zone is perforated.

10. The filter canister according to claim 1 wherein the sheet of flexible fabric material is removably connected to the frame.

11. The filter canister according to claim 10 further comprising:
    a plurality of connectors which removably connect the sheet of flexible fabric material to the frame.

12. The filter canister according to claim 1 wherein the sheet of flexible fabric material is in the form of a sleeve having a first end which is sealed to a portion of the frame and a second end that is open, wherein upon placement of the filter canister into a body of water the second end extends above the surface of the body of water.

13. The filter canister according to claim 12 wherein the sleeve is suspended internally of the frame.

14. The filter canister according to claim 1 wherein the frame is segmented into two or more sections, at least two of the two or more sections having a sheet of flexible fabric material connected thereto, with the two or more sections defining the internal zone.

15. The filter canister according to claim 14 wherein each of the at least two sections is bordered by a frame member and a clamp member attached to the frame member.

16. The filter canister according to claim 15 wherein along each edge of the at least two sections, the frame member and clamp member define a recess having an opening through which an edge of the sheet of flexible fabric material passes.

17. The filter canister according to claim 16 further comprising:
    retaining means for retaining the edge of the sheet of flexible material between the frame member and clamp member.

18. The filter canister according to claim 17 wherein the sheet of flexible material is multi-layered and the retaining means is rod positioned within the multiple layers of the sheet of flexible material, with the rod having a thickness that is greater than the dimension of the opening to the recess.

19. The filter canister according to claim 14 wherein the frame has a box-shaped configuration segmented into six sections.

20. The filter canister according to claim 15 wherein one of the two or more sections is substantially fluid impervious and the conduit passes therethrough.

21. A system for filtering fluid intake comprising:
    a fluid intake system comprising at least one inlet in fluid communication with a fluid intake pump; and
    at least one filter canister according to claim 1 with the first end of the conduit in fluid communication with the at least one inlet.

22. The system according to claim 21, wherein the fluid intake system comprises two or more inlets and two or more filter canisters, with each inlet being in fluid communication with the first end of the conduit on exactly one filter canister.

23. The system according to claim 21, wherein the filter canister is removable from the water intake system.

24. A method of filtering water entering a water intake system comprising:
    installing a filter canister according to claim 1 into a water intake system with the first end of the conduit in fluid communication with an inlet to the water intake system; and
    drawing water through the water intake system, whereby water entering the water intake system is drawn through the sheet of flexible fabric material into the internal zone, thereby filtering the water, prior to passing through the second end of the conduit for delivery into the water intake system.

25. The filter canister according to claim 1, wherein the filter canister is portable.

26. A filter canister for use in a fluid intake system, the filter canister comprising:
    a frame;
    a multi-layered sheet of flexible fabric material that allows a flow of fluid therethrough, the sheet of flexible fabric material being connected to the frame in a manner defining an internal zone whereby substantially all fluid entering the internal zone from an opposite side of the sheet of flexible fabric material passes therethrough;

a conduit extending, with a substantially fluid tight seal, through the frame, with a first end located externally of the frame and a second end located within the internal zone; and a gas injection system comprising a source of compressed gas in fluid communication with at least one outlet positioned between two layers of the sheet of flexible fabric material;

wherein, upon connection of the first end of the conduit to a fluid intake system, fluid is drawn through the sheet of flexible fabric material into the internal zone, thereby filtering the fluid, and filtered fluid is drawn through the second end of the conduit for delivery into the fluid intake system.

27. A system for filtering fluid intake comprising:
a fluid intake system comprising at least one inlet in fluid communication with a fluid intake pump; and
at least one filter canister according to claim 26 with the first end of the conduit in fluid communication with the at least one inlet.

28. The system according to claim 27, wherein the fluid delivery system comprises two or more inlets and two or more filter canisters, with each inlet being in fluid communication with the first end of the conduit on exactly one filter canister.

29. A method of filtering water entering a water intake system comprising:
installing a filter canister according to claim 26 into a water intake system with the filter canister substantially submerged and the first end of the conduit in fluid communication with an inlet to the water intake system; and
drawing water through the water intake system, whereby water entering the water intake system is drawn through the sheet of flexible fabric material into the internal zone, thereby filtering the water, prior to passing through the second end of the conduit for delivery into the water intake system.

30. A filter canister for use in a fluid intake system, the filter canister comprising:
a frame comprising horizontal and vertical support members and an upper end;
a sleeve formed of multi-layers of flexible fabric material that allow a flow of fluid therethrough, the sleeve having a closed end and an open end and being connected internally of the frame with the open end adjacent the upper end of the frame, the sleeve defining an internal zone whereby substantially all fluid entering the internal zone from an opposite side of the sleeve passes through the multi-layers flexible fabric material;
a conduit passing through the open end of the sleeve with a first end located externally of the frame and a second end located within the internal zone; and
a gas injection system comprising a source of compressed gas in fluid communication with at least one outlet positioned between two layers of the flexible fabric material that form the sleeve;
wherein, upon connection of the first end of the conduit to a fluid intake system, fluid is drawn through the multi-layers of flexible fabric material into the internal zone, thereby filtering the fluid, and filtered fluid is drawn through the second end of the conduit for delivery into the fluid intake system.

31. A system for filtering fluid intake comprising:
a fluid intake system comprising at least one inlet in fluid communication with a fluid intake pump; and at least one filter canister according to claim 30 with the first end of the conduit in fluid communication with the at least one inlet.

32. The system according to claim 31, wherein the fluid delivery system comprises two or more inlets and two or more filter canisters, with each inlet being in fluid communication with the first end of the conduit on exactly one filter canister.

33. A method of filtering water entering a water intake system comprising:
installing a filter canister according to claim 30 into a water intake system with the upper end of the frame and the open end of the sleeve above the water level and the second end of the conduit below the water level, and the first end of the conduit in fluid communication with an inlet to the water intake system; and
drawing water through the water intake system, whereby water entering the water intake system is drawn through the sheet of flexible fabric material into the internal zone, thereby filtering the water, prior to passing through the second end of the conduit for delivery into the water intake system.

34. A filter canister for use in a fluid intake system, the filter canister comprising:
a frame;
a filter formed of exactly two layers of a geosynthetic fabric, the filter being connected to the frame in a manner defining an internal zone whereby substantially all fluid entering the internal zone from an opposite side of the filter passes through the geosynthetic fabric;
a gas injection system comprising a source of compressed gas in fluid communication with at least one outlet positioned between the two layers of geosynthetic fabric; and
a conduit in fluid communication with the internal zone defined by the filter, and having an end located externally of the frame;
wherein, upon connection of the end of the conduit to a fluid intake system, fluid is drawn through the filter into the internal zone, thereby filtering the fluid, and filtered fluid is drawn through the conduit for delivery into the fluid intake system.

35. A system for filtering fluid intake comprising:
a fluid intake system comprising at least one inlet in fluid communication with a fluid intake pump; and
at least one filter canister comprising:
a frame
a filter formed of two or more layers of geosynthetic fabric, the filter being connected to the frame in a manner defining an internal zone whereby substantially all fluid entering the internal zone from an opposite side of the filter passes through the geosynthetic fabric;
a conduit in fluid communication with the internal zone defined by the filter, and having an end located externally of the frame with the end of the conduit in fluid communication with the at least one inlet;
wherein, upon connection of the end of the conduit to the fluid intake system, fluid is drawn through the filter into the internal zone, thereby filtering the fluid, and filtered fluid is drawn through the conduit for delivery into the fluid intake system.

36. The system according to claim 35, wherein the fluid intake system comprises two or more inlets and two or more filter canisters, with each inlet being in fluid communication with the end of the conduit on exactly one filter canister.

* * * * *

UNITED STATES PATENT AND TRADEMARK OFFICE
CERTIFICATE OF CORRECTION

PATENT NO. : 7,338,607 B2
APPLICATION NO. : 10/287859
DATED : March 4, 2008
INVENTOR(S) : Hal B. Dreyer and Dennis Nottingham It is certified that error appears in the above-identified patent and that said Letters Patent is hereby corrected as shown below:

Column 9 at line 21, insert --material-- between "fabric" and "is".

Column 9 at line 38, insert --fabric-- between "flexible" and "material".

Column 9 at line 50, insert --system-- between "injection" and "comprises".

Column 10 at line 21, insert --fabric-- between "flexible" and "material".

Column 10 at line 24, insert --fabric-- between "flexible" and "material".

Column 10 at line 25, insert --a-- between "is" and "rod".

Column 10 at line 26, insert --fabric-- between "flexible" and "material".

Column 11 at line 53, insert --of-- between "layers" and "flexible".

Column 12 at line 5, delete "delivery" and insert --intake-- in its place.

Signed and Sealed this

Eleventh Day of May, 2010

David J. Kappos
*Director of the United States Patent and Trademark Office*